United States Patent
Misaki et al.

(10) Patent No.: US 7,448,461 B2
(45) Date of Patent: Nov. 11, 2008

(54) COWL STRUCTURE OF VEHICLE

(75) Inventors: Kenichi Misaki, Saitama (JP); Atsushi Takasaki, Saitama (JP); Takefumi Okubo, Saitama (JP); Masato Nagata, Saitama (JP); Hiroyuki Miyazaki, Saitama (JP); Yoshiaki Muta, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 143 days.

(21) Appl. No.: 11/390,069

(22) Filed: Mar. 28, 2006

(65) Prior Publication Data

US 2006/0219450 A1    Oct. 5, 2006

(30) Foreign Application Priority Data

Mar. 31, 2005   (JP)  ............................. 2005-103847

(51) Int. Cl.
*B60K 11/04* (2006.01)
*B62M 7/02* (2006.01)

(52) U.S. Cl. .................. 180/68.4; 180/68.1; 180/229

(58) Field of Classification Search ............. 180/68.4, 180/68.6, 68.1, 68.2, 229
See application file for complete search history.

(56) References Cited

U.S. PATENT DOCUMENTS

| | | | | |
|---|---|---|---|---|
| 4,249,626 A * | 2/1981 | Fields et al. | ............... | 180/68.1 |
| 4,535,866 A * | 8/1985 | Shiga | ............... | 180/215 |
| 4,566,407 A * | 1/1986 | Peter | ............... | 123/41.48 |
| 4,633,965 A * | 1/1987 | Tsurumi et al. | ............... | 180/229 |
| 4,653,788 A * | 3/1987 | Di Giusto | ............... | 293/117 |
| 4,660,624 A * | 4/1987 | Yamaguchi | ............... | 165/41 |
| 4,687,069 A * | 8/1987 | Inomata et al. | ............... | 180/68.2 |
| 4,858,565 A * | 8/1989 | King | ............... | 123/41.31 |
| 4,887,688 A * | 12/1989 | Horiike et al. | ............... | 180/229 |
| 4,964,484 A * | 10/1990 | Buell | ............... | 180/219 |
| 5,078,223 A * | 1/1992 | Ishiwatari et al. | ............... | 180/68.1 |
| 5,211,255 A * | 5/1993 | Fukuda | ............... | 180/219 |
| 5,330,029 A * | 7/1994 | Yoshimura et al. | ............... | 180/219 |
| 5,476,138 A * | 12/1995 | Iwasaki et al. | ............... | 165/41 |
| 5,566,746 A * | 10/1996 | Reise | ............... | 165/41 |
| 5,575,526 A * | 11/1996 | Wycech | ............... | 296/205 |
| 5,901,808 A * | 5/1999 | Swenson et al. | ............... | 180/229 |
| 5,915,490 A * | 6/1999 | Wurfel | ............... | 180/68.1 |
| 6,168,226 B1 * | 1/2001 | Wycech | ............... | 296/146.6 |
| 6,332,505 B1 * | 12/2001 | Tateshima et al. | ............... | 180/229 |

(Continued)

FOREIGN PATENT DOCUMENTS

JP            8-225092 A        9/1996

*Primary Examiner*—Jeffrey J Restifo
(74) *Attorney, Agent, or Firm*—Birch, Stewart, Kolasch & Birch, LLP (57) ABSTRACT

To provide a cowl structure for a vehicle for improving the appearance of the vehicle without increasing the weight of the vehicle and also for enhancing the operational stability. In a cowl structure for a vehicle which includes a front cowl for covering a front portion of a vehicle body, a radiator is positioned in front of the cylinder heads of the engine. A radiator cover is provided for covering the radiator ranging from side surfaces to a lower end of the radiator. Bulging portions are provided for bulging from a front portion to a rear portion of the radiator cover and being formed in a direction to be rearwardly and upwardly oblique in a side view of the vehicle. The bulging portions are formed on a lower end portion of the radiator cover.

16 Claims, 7 Drawing Sheets

U.S. PATENT DOCUMENTS

| | | | |
|---|---|---|---|
| 6,502,653 B1 * | 1/2003 | Balzer et al. | 180/68.4 |
| 6,505,696 B1 * | 1/2003 | Prevost | 180/68.4 |
| 6,513,579 B1 * | 2/2003 | Kent et al. | 165/67 |
| 6,543,525 B2 * | 4/2003 | Kalbacher | 165/140 |
| 6,681,876 B1 * | 1/2004 | Haneda et al. | 180/68.4 |
| 6,729,424 B2 * | 5/2004 | Joutaki et al. | 180/68.4 |
| 7,080,704 B1 * | 7/2006 | Kerner et al. | 180/68.1 |
| 7,140,329 B2 * | 11/2006 | Ohzono et al. | 123/41.1 |
| 7,159,682 B2 * | 1/2007 | Arnold | 180/229 |
| 2003/0183432 A1 * | 10/2003 | Suzuki | 180/68.1 |
| 2007/0017721 A1 * | 1/2007 | Dufresne et al. | 180/68.6 |

* cited by examiner

COWL STRUCTURE OF VEHICLE

CROSS-REFERENCE TO RELATED APPLICATIONS

The present application claims priority under 35 USC 119 to Japanese Patent Application No. 2005-103847 filed on Mar. 31, 2005 the entire contents of which are hereby incorporated by reference.

1. Field of the Invention

The present invention relates to a cowl structure of a vehicle for covering an outside of a vehicle body and an engine.

2. Description of Background Art

A cowl structure is known wherein an aerodynamic characteristic of a vehicle is enhanced by the cowl structure of the vehicle. Such a cowl structure includes upper and lower air guide fins which extend longitudinally and range from a rear portion of a front wheel to a front portion of a rear wheel. The upper and lower air guide fins are mounted on sides of a cowling. In such a cowl structure of the vehicle, when the vehicle is largely banked at the time of turning, one side wall of a V-shaped portion of an air guide fin which is formed on a lower portion of the cowling approaches a road surface thus generating a Venturi effect. Air traveling past the cowling at a high speed due to the Venturi effect generates a negative pressure. The negative pressure acts on the cowling as a downward force so as to increase a gripping force of the front and rear wheels to the road surface. See, for example, JP-A-8-225092.

However, in JP-A-8-225092, since the air guide fins extend to range from the rear portion of the front wheel to the front portion of the rear wheel in the longitudinal direction of the cowling, a length of the air guide fins in the longitudinal direction is elongated. Thus, it is possible that a weight of the vehicle is increased. Further, the appearance of the vehicle is not favorable.

SUMMARY AND OBJECTS OF THE INVENTION

It is an object of an embodiment of the present invention to overcome the above-mentioned drawbacks and to provide a cowl structure of a vehicle for improving the appearance of a vehicle without increasing the weight of the vehicle and also for enhancing the aerodynamic characteristic of the vehicle.

To achieve the above-mentioned object, an embodiment of the present invention is directed to a cowl structure of a vehicle which includes a front cowl for covering a front portion of a vehicle body with a radiator being positioned in front of cylinder heads of an engine. A radiator cover is provided for covering the radiator. The radiator cover ranges from side surfaces to a lower end of the radiator with bulging portions that bulge from a front portion to a rear portion of the radiator cover. The bulging portions are formed in the rearward and upward oblique direction in a side view of the vehicle and are formed on a lower end portion of the radiator cover.

According to an embodiment of the present invention, the front cowl includes projecting portions which bulge toward an outside of the vehicle body as compared to the bulging portions behind the radiator.

According to an embodiment of the present invention, the projecting portions are positioned above the bulging portions.

According to an embodiment of the present invention, the radiator cover includes an opening portion which opens toward a rear portion of the vehicle body.

According to the cowl structure of an embodiment of the invention, the bulging portions which are formed in the rearward and upward oblique direction as viewed in a side view of the vehicle are, in the vicinity of a head pipe and a front fork, mounted on the lower end portion of the radiator cover which covers the radiator ranging from side surfaces to a lower end of the radiator in front of cylinder heads of the engine. Thus, it is possible to easily apply the downward force (downward thrust) which pushes a vehicle body downwardly to a front wheel. Further, the bulging portions which apply the downward force to the front wheel are mounted on the lower end portion of the radiator cover. Thus, different from the conventional structure, there exists no possibility that a length of the cowl structure in the longitudinal direction is elongated. According to an embodiment of the present invention, it is unnecessary to increase the weight of the vehicle body and it is also possible to improve the appearance of the vehicle.

According to the cowl structure of an embodiment of the present invention, the projecting portions of the front cowl bulge toward the outside of the vehicle body as compared to the bulging portions behind the radiator. Thus, it is possible to enhance an aerodynamic characteristic of the vehicle by smoothly making use of a air that travels over the cowling and is deflected toward the outside of the vehicle body by the bulging portions and is directed toward a rear portion of the vehicle body.

According to the cowl structure of an embodiment of the present invention, the projecting portions formed on the front cowl are arranged above the bulging portions. Thus, portions of the air that travels over the cowling are deflected toward the upper portion of the vehicle body by the bulging portions and are received by the lower surfaces of the projecting portions so as to change the directions of the flow of the portions of the traveling air downwardly. Thus, it is possible to reduce an influence of the air on a rider.

According to the cowl structure of an embodiment of the invention, since the radiator cover forms the opening portion which opens toward the rear portion of the vehicle body, a negative pressure is generated behind the radiator cover by the air that travels thereover and is deflected as the traveling air passes the bulging portions of the radiator cover during operation of the vehicle. Accordingly, the air can easily pass trough the radiator. Thus, it is possible to enhance a cooling efficiency of the radiator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, best modes for carrying out of a cowl structure of a vehicle according to the present invention are explained in detail in conjunction with the drawings.

Figure 1:
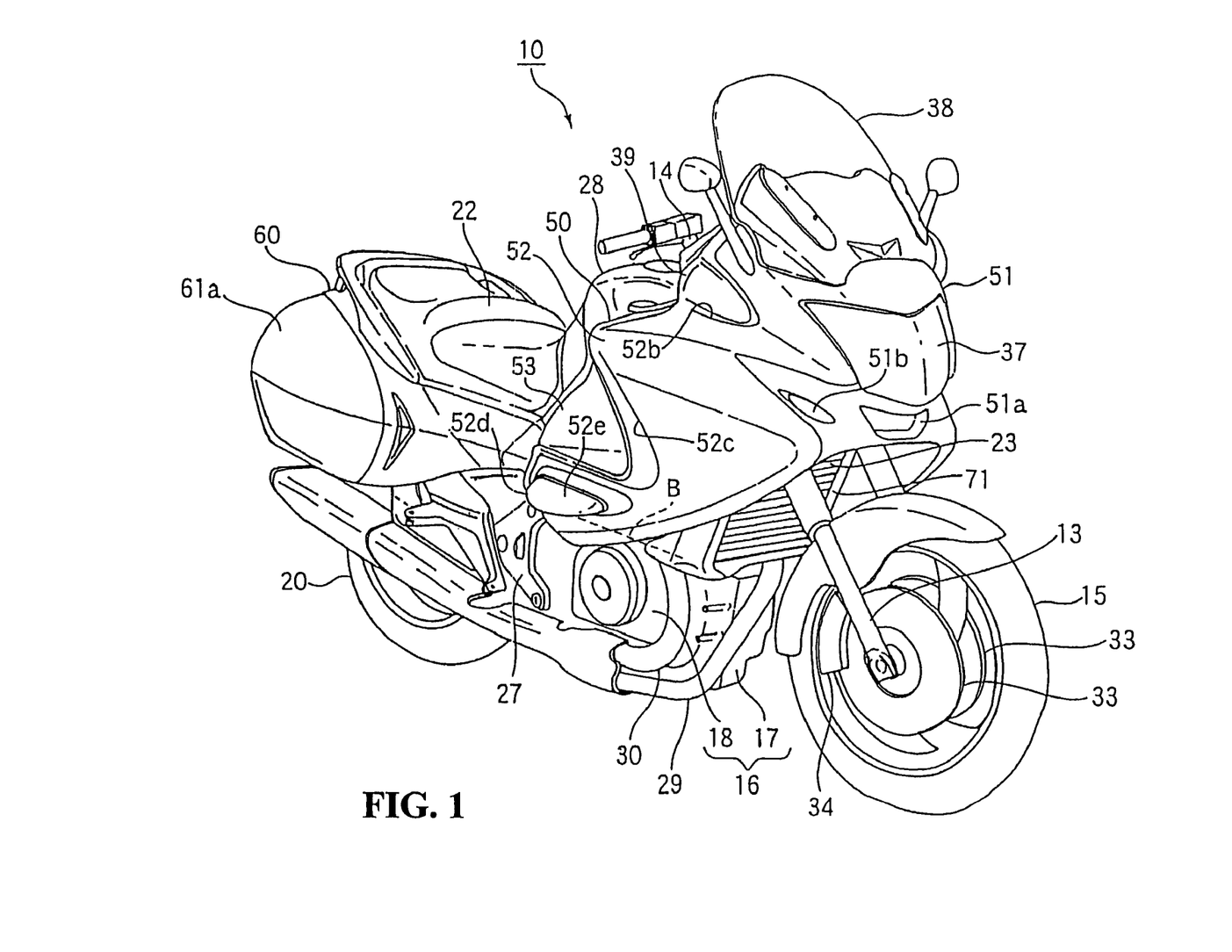
FIG. 1 illustrates a perspective view as viewed from an oblique front direction of a motorcycle which mounts the cowl structure of a vehicle according to the present invention thereon.
Figure 2:
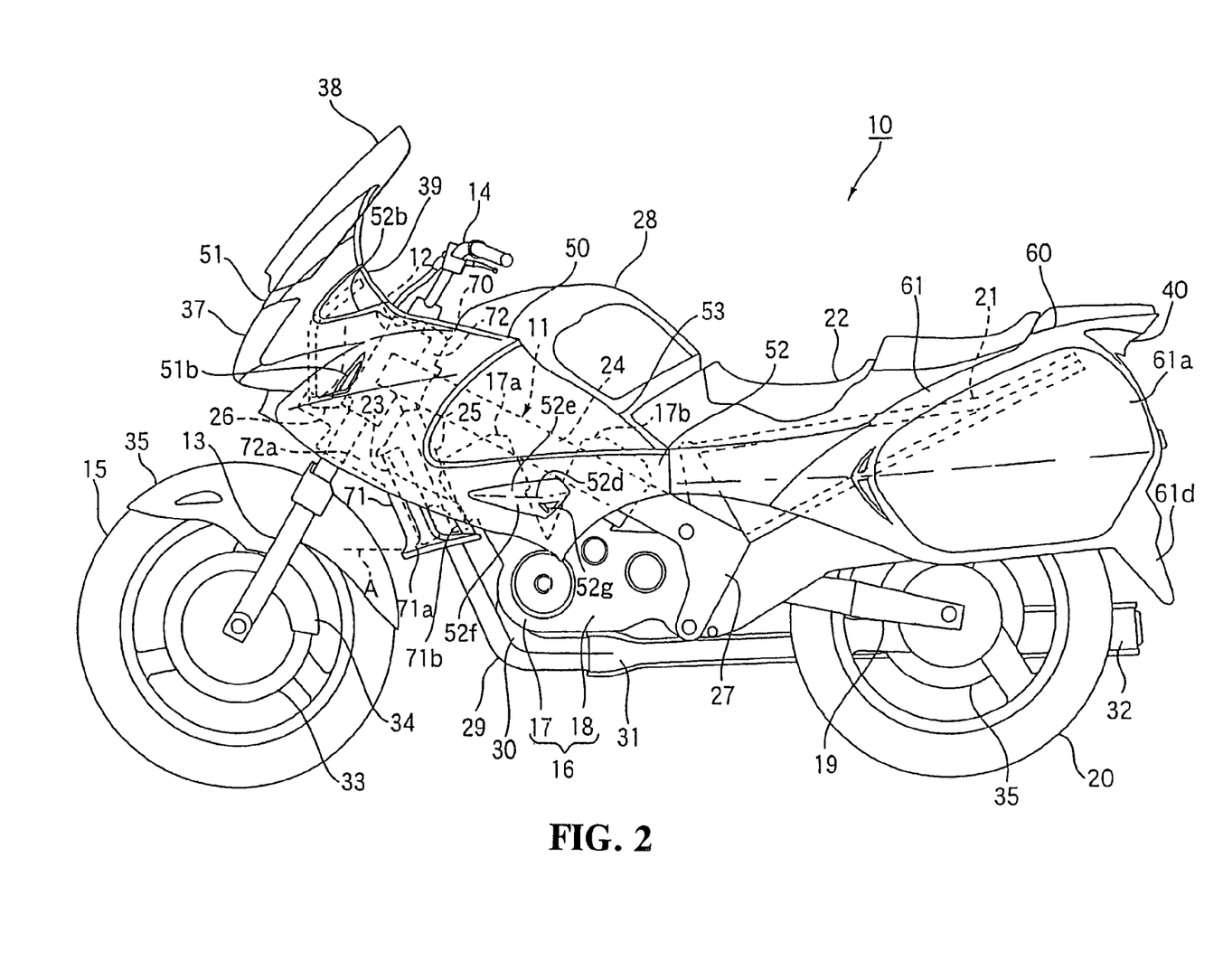
FIG. 2 illustrates a side view of the motorcycle shown in FIG. 1.

FIG. 1 to FIG. 7 show the first embodiment of the present invention. As shown in FIGS. 1 and 2, the motorcycle 10 is a vehicle that includes a frame 11, a front fork 13 which is mounted on a head pipe 12 provided to a front portion of the frame 11 and a handle 14 which is connected to an upper portion of the front fork 13. A front wheel 15 is mounted on a lower portion of the front fork 13. A power unit 16, which includes an engine 17 and a transmission 18, is mounted on a front lower portion of the frame 11. A swing arm 19 is mounted on a rear lower portion of the frame 11 with a rear wheel 20 being mounted on the swing arm 19. A tandem seat 22 is mounted on a rear upper portion of the frame 11 by way of seat rails 21. The rear wheel 20 is driven by the power unit 16.

Further, the motorcycle 10 includes a radiator 23 which is arranged below a front portion of the frame 11. The motorcycle 10 also includes a front cowl 50 for covering a front portion and both front side portions of the frame 11 with a rear cowl 60 for covering a rear portion and both rear side portions of the frame 11. An inner cowl 70 is provided which integrally incorporates a radiator cover 71 surrounding the radiator 23 therein. The inner cowl 70 is mounted in the inside of the front cowl 50. The front cowl 50, the rear cowl 60 and the inner cowl 70 are formed by molding using a synthetic resin such as a lightweight FRP.

The frame 11 includes a pair of left and right main frames 24 which are formed into a substantially U-shape by casting an aluminum alloy, for example. The left and right main frames 24 extend rearwardly and downwardly. A cylindrical head pipe 12 is mounted on a front end portion of the main frames 24. In addition, the frame 11 also includes a down tube 25 which is connected to the front end portion of the main frame 24 and extends in the rearward and downward direction to a rear portion of the head pipe 12. A front bracket 26 is provided which extends to a front portion of the head pipe 12 in a state wherein the front bracket 26 extends upwardly in a substantially L-shape. A pivot plate 27 is arranged at a lower rear end portion of the main frame 24 which is connected to a front end portion of the seat rail 21 which extends in the rearward and upward direction.

In the power unit 16, the engine 17 is a water-cooled 4-stroke OHC system 3-valve V-type two-cylinder engine which integrally incorporates the transmission 18 therein. The engine 17 is supported on the main frame 24, the pivot plate 27 and the down tube 25. Above the power unit 16, a fuel tank 28 is mounted on an air cleaner (not shown in the drawings). In the engine 17, a carburetor (not shown in the drawings) is connected to intake ports of a front cylinder-side cylinder head 17a and a rear cylinder-side cylinder head 17b, while an exhaust pipe 29 of the front cylinder-side cylinder head 17a and an exhaust pipe 30 of the rear cylinder-side cylinder head 17b are connected to a collecting pipe 31 below the engine 17. The collecting pipe 31 is connected to a muffler 32. An output of the transmission 18 is taken out from a side portion of the transmission 18 and is transmitted to a sprocket wheel (not shown in the drawings) which is fixed to the rear wheel 20 by way of a chain (not shown in the drawings).

A front suspension (not shown in the drawings), which includes a coil spring and a damper, is incorporated in the front fork 13. At the same time, a caliper 34 which imparts a braking force to a pair of disk rotors 33 fixed to the front wheel 15 is assembled to the front fork 13. A front fender 35 for covering an upper portion of the front wheel 15 is mounted on the front fork 13.

The swing arm 19 is tiltably supported on a pivot plate 27 and is dampened by a rear suspension (not shown in the drawings) which includes a coil spring and a damper which is arranged between the swing arm 19 and the frame 11. Further, a disk rotor 35 is mounted on the rear wheel 20 in the same manner as the front wheel 15.

The radiator 23 is fixed to the down tube 25 using bolts behind the front wheel 15 and in front of a front-cylinder-side cylinder head 17a of the engine 17. Further, a periphery of a side portion of the radiator 23 is covered with a radiator cover 71 which is formed below an inner cowl 70.

The front cowl 50 includes a front center cowl 51, left and right outer cowls 52, 52, and left and right middle cowls 53, 53.

The front center cowl 51 mounts a head light unit 37 on a distal end of a front surface thereof and mounts a center air inlet 51a on a portion thereof below the head light unit 37. Further, a pair of left and right side air inlets 51b, 51b is mounted on both sides of the center air inlet 51a in a symmetric manner on the left-and-right.

The front center cowl 51 is arranged between front distal ends of the left and right outer cowls 52, 52 and is fixed to a front bracket 26 using bolts. The center air inlet 51a is arranged at the center of a front end portion of the front center cowl 51 and above the front wheel 15. Thus, air is introduced from a front side and is supplied to an air cleaner during operation of the vehicle. Since side air inlets 51b, 51b are arranged on both sides of a front end portion of the front center cowl 51 and above the front wheel 15, portions of the air that is introduced are made to flow in the direction toward the left and right middle cowls 53, 53 during operation of the vehicle.

A wind screen 38 is fixed to an upper portion of the front center cowl 51. A meter unit (not shown in the drawing) is fixed to the front bracket 26 and is arranged in the inside of the front center cowl 51. By combining the front center cowl 51 with the left and right outer cowls 52, 52, the front center cowl 51 receives the air during the operation of the vehicle from the front side to thus impart a downward force to the front wheel 15.

Since the left and right outer cowls are formed to be symmetric in a left-and-right direction, only the left outer cowl 52 is explained here. The outer cowl 52 is arranged in a state wherein the outer cowl 52 covers a side portion of the head pipe 12, a front side portion of the main frame 24, and side portions of both cylinder heads 17a, 17b of the engine 17. The outer cowl 52 is fixed to the main frame 24, the pivot plate 27 and the front bracket 26 using bolts.

The outer cowl 52 includes a side-winker notch 52b which is arranged on an upper portion of the outer cowl 52, a middle-cowl notch 52c, and a projecting portion 52d which is arranged below the middle cowl 53.

To the side-winker notch 52b, the side-winker 39 which is connected to the front bracket 26 by using a bolt.

On the middle-cowl notch 52c, a middle cowl 53 which is connected to the main frame 24 is mounted by using a bolt. The middle cowl 53 includes a slit-shaped opening (not shown in the drawings) which is directed to the side air inlet 51b of the front center cowl 51. Thus, it is possible to allow the air during operation to be introduced from both side air inlets 51b, 51b to flow rearwardly along the side surfaces of the vehicle body.

Further, the projecting portion 52d is formed in an inverse-triangular-shape as viewed from the vehicle body side surface direction and is formed in a wing shape extending from a front portion to a rear portion and, thereafter, bulges toward the outside of the vehicle body at a rear-side position of the radiator 23. In the projecting portion 52d, an upper surface 52e which forms an upper portion of the projecting portion 52d is arranged substantially horizontally, a lower surface 52f which forms a front lower portion of the projecting portion 52d is arranged in the rearward and downward direction, and an air outlet 52g is formed in the projecting portion 52d in the vicinity of a position close to a rear portion of the lower portion surface 52f thereof.

On a rear portion of the outer cowl 52, a side cowl 61 of a rear cowl 60 having a pair of left and right symmetrical saddle bags 61a and a rear fender 61b is continuously mounted. A rear combination lamp 40 is mounted on a upper portion of a rear end of the rear cowl 60.

The inner cowl 70 includes left and right inner cowls 72, 72. The left and right inner cowl 72, 72 are integrally formed in the inside of the left and right outer cowls 52, 52 by way of a hollow portion thus performing a function of enhancing the rigidity of the whole front cowl 50 and providing a reduction in the weight of the whole front cowl 50. Since the left and right inner cowls 72, 72 are formed to be symmetric in a left and right direction, only the left inner cowl 72 is explained here.

Figure 7:
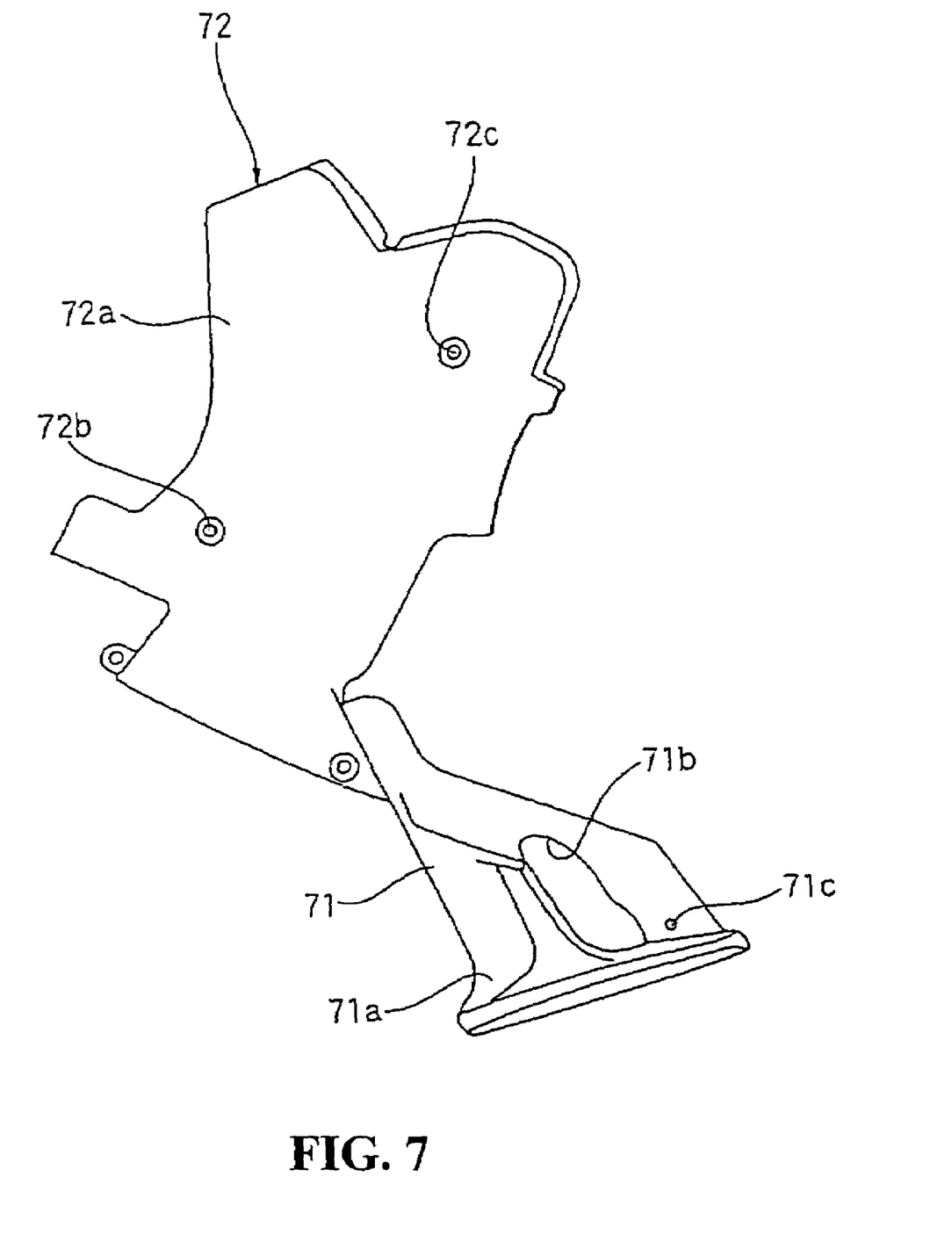
FIG. 7 illustrates a single-body side view of a left inner cowl used in a motorcycle shown in FIG. 1.

The inner cowl 72 includes a shell portion 72a which is not exposed to the outside and a radiator cover 71. The shell portion 72a is arranged at an upper portion of the inner cowl 72 and is fixed to the frame side using a bolt. The radiator cover 71 which is arranged at a lower portion of the inner cowl 72 is fixed to the down tube 25 using a bolt. The radiator cover 71 is formed in a shape which allows the radiator cover 71 to cover from a side surface to a lower end portion of the radiator 23.

Further, a bulging portion 71a is formed on the radiator cover 71. The bulging portion 71a includes a lower end portion which projects toward a lower portion of the left outer cowl 52 of the radiator cover 71, bulges in a droplet shape extending from a front portion to a rear portion, and is formed in an oblique rearward and upward direction as viewed in a vehicle side view. Further, an opening portion 71b is formed in a rear portion of the radiator cover 71.

The bulging portion 71a is arranged on a lower end portion of the outer cowl 52 which is positioned in the vicinity of a rear portion of the front wheel 15 and projects downwardly. The bulging portion 71a bulges from a front portion to a rear portion and is formed in an oblique rearward and upward direction as viewed in a vehicle side view.

Figure 3:
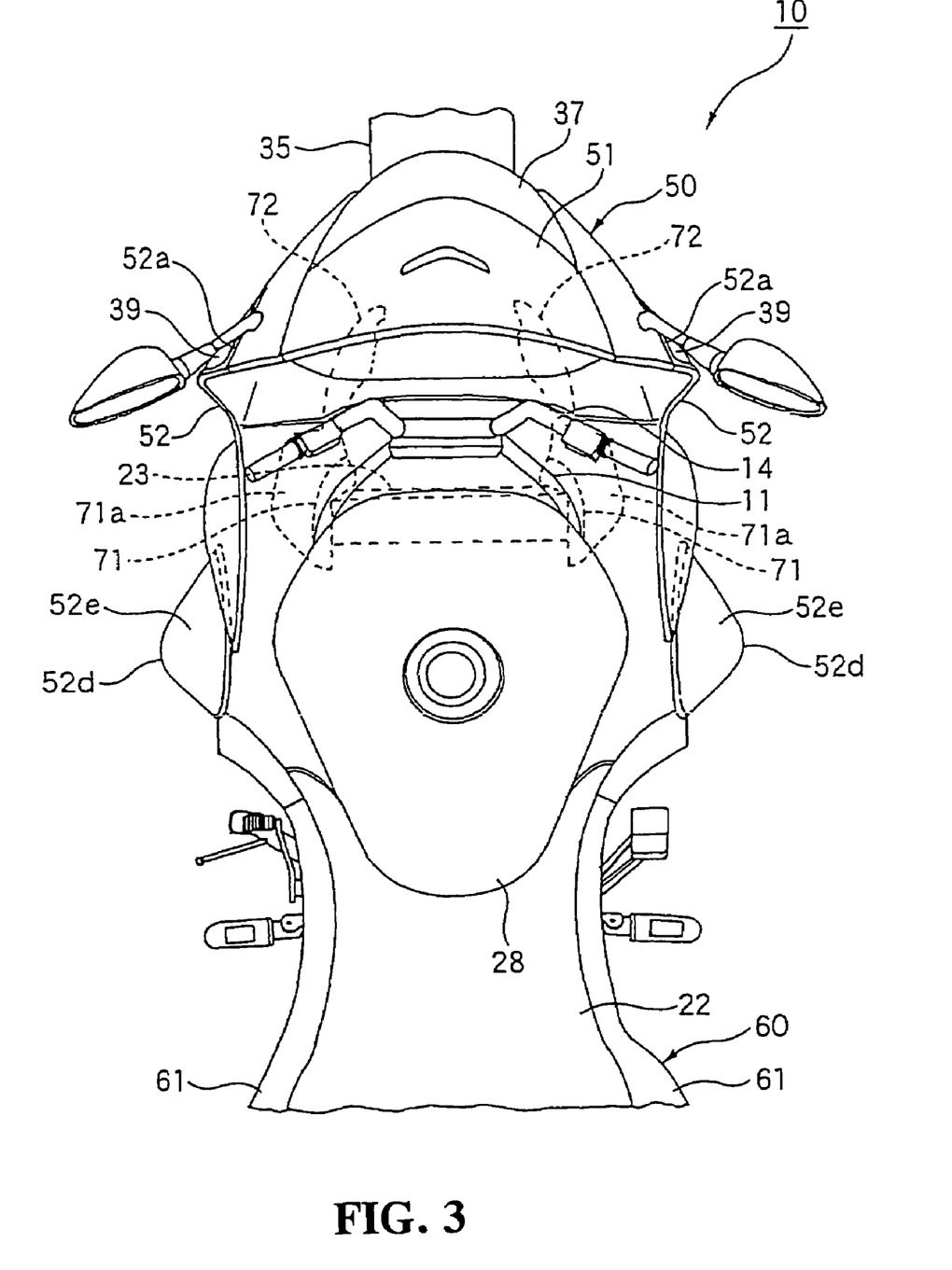
FIG. 3 illustrates a plan view of the motorcycle shown in FIG. 1.

As shown in FIG. 3, with respect to the positional relationship between the bulging portion 71a of the radiator cover 71 and the projecting portion 52d of the outer cowl 52, the projecting portion 52d is arranged behind the bulging portion 71a. The projecting portion 52d bulges more toward the outside of the vehicle body as compared to the bulging portion 71a. The projecting portion 52d is positioned above the bulging portion 71a.

Figure 4:
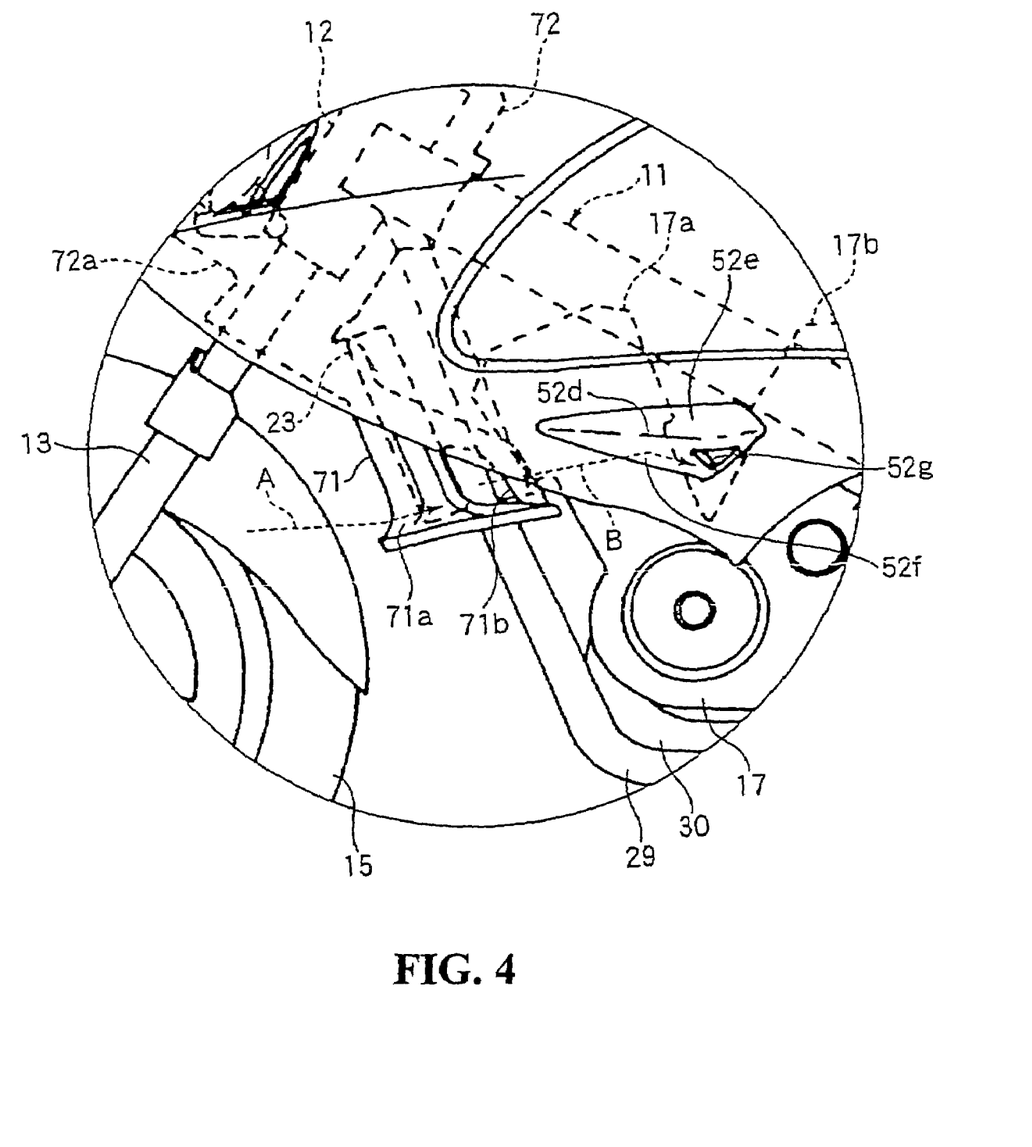
FIG. 4 illustrates an enlarged view of the surrounding of a radiator of the motorcycle shown in FIG. 2.

As shown in FIG. 4, the bulging portion 71a of the radiator cover 71 receives and deflects the air A which flows rearwardly toward the front wheel 15 during operation of the vehicle. Thus, the deflected air A performs the function of applying a down force which pushes a vehicle body downwardly toward the front wheel 15.

The opening portion 71b is formed in a rear portion of the radiator cover 71 in the vicinity of the bulging portion. Thus, by making use of a negative pressure which is generated by the air which is deflected as the air passes the bulging portion 71a of the radiator cover 71, it is possible to make the air easily pass through the radiator 23.

Accordingly, as indicated by a broken line shown in FIG. 4, since the projecting portion 52d can smoothly make use of a air B which is deflected toward the side of the vehicle body by the bulging portion 71a and is directed toward the rear portion of the vehicle body in the vicinity of the projecting portion 52d and, at the same time, the portion of the air B which is deflected toward the upper portion of the vehicle body by the bulging portion 71a is received by the lower portion surface 52f and is changed downwardly, the projecting portion 52d can reduce a portion of the air which is directed to a rider. The lower surface 52f of the projecting portion 52d extends rearwardly and downwardly and, at the same time, an air outlet 52g is arranged in the vicinity of the rear portion of the lower portion surface 52f. Thus, it is possible to allow the air which passes along the inner surface of the outer cowl 52 and air that is warmed around the engine to easily pass rearwardly through the air outlet 52g.

Figure 5:
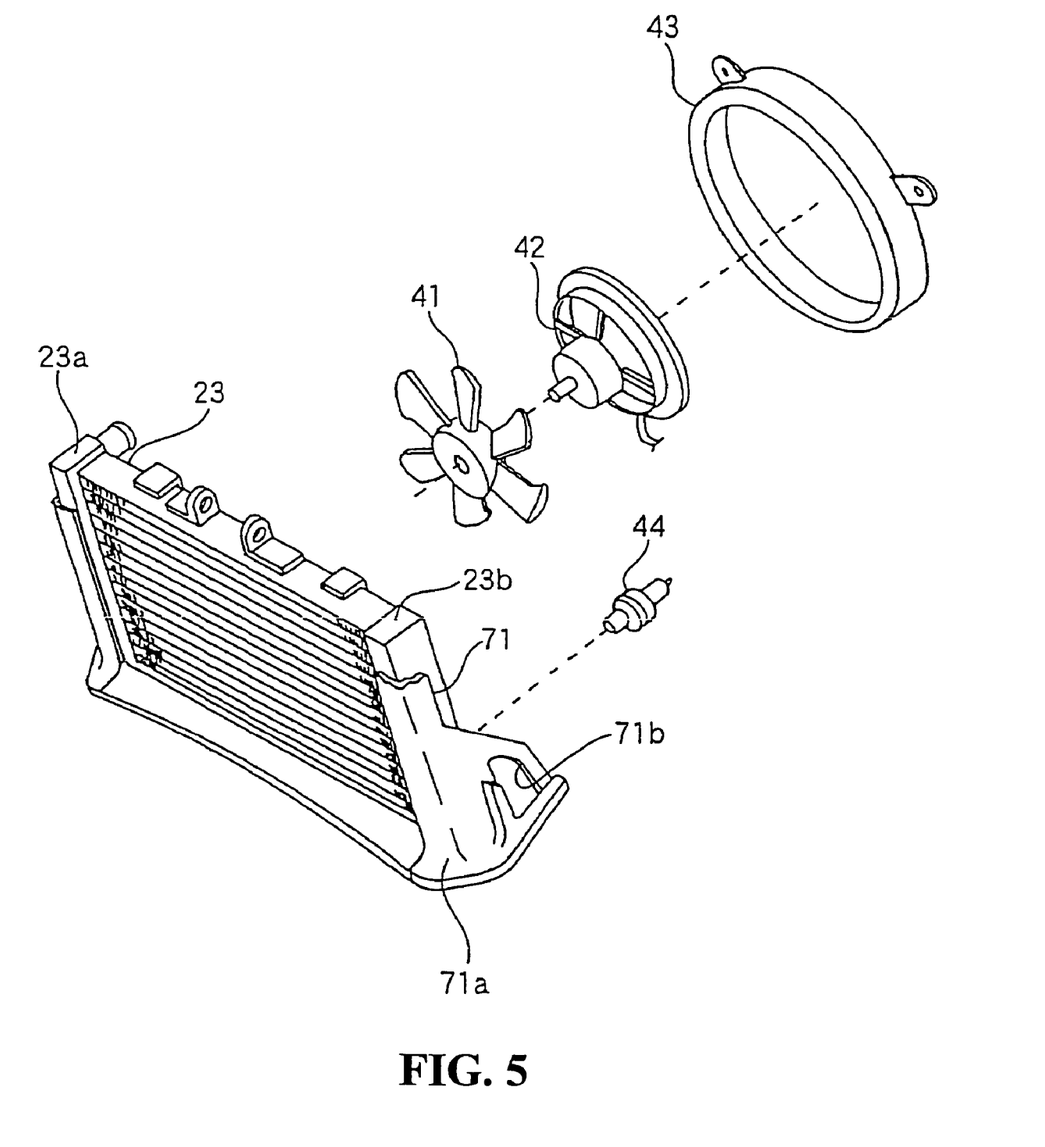
FIG. 5 illustrates a perspective view of the motorcycle shown in FIG. 1 as viewed from the oblique front direction for explaining the mounting relationship among respective parts around the radiator.

As shown in FIG. 5, the radiator 23 is arranged in a forwardly inclined manner by the radiator cover 71. The radiator 23 is of a lateral-flow type in which a coolant which is introduced to a right side tank 23a of the radiator 23 flows into a left side tank 23b of the radiator 23 so as to cool the coolant. On a rear portion of the radiator 23, a fan 41, a blower motor 42, a fan shroud 43 and a thermo switch 44 are mounted. The radiator 23 can enhance the engine cooling performance such that when a temperature of the coolant which flows in the inside of the radiator 23 exceeds a preset value, the thermo switch 44 is turned on. Thus, the blower motor 42 starts to rotate the fan 41.

Figure 6:
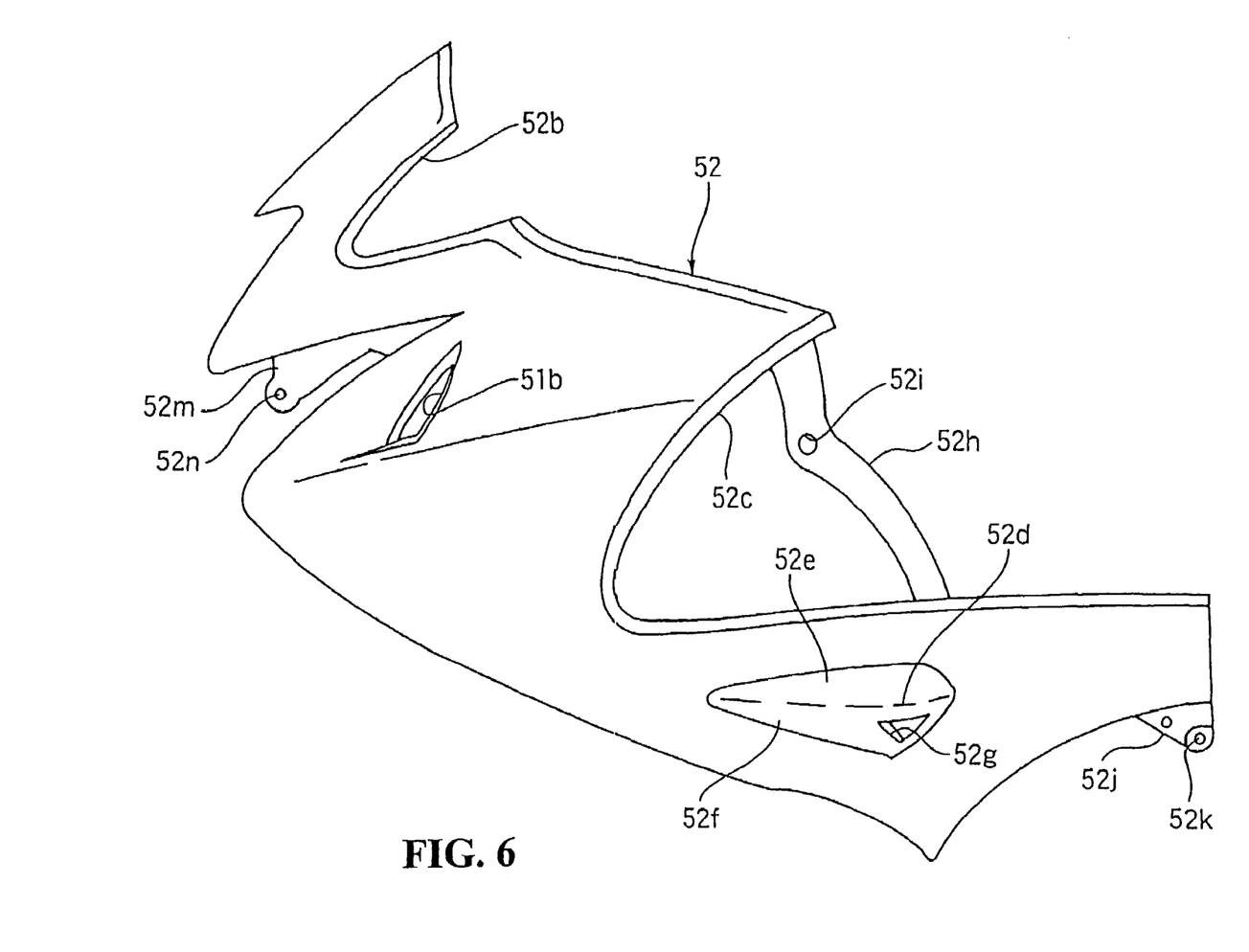
FIG. 6 illustrates a single-body side view of a left outer cowl used in a motorcycle shown in FIG. 1.

As shown in FIG. 6, the outer cowl 52 includes a stay 52h which extends in the inside of the middle-cowl notch 52c and a main-frame-fixing bolt hole 52i is formed in the stay 52h. Further, the outer cowl 52 includes a flange 52j on a lower end portion thereof and a main-frame-fixing bolt hole 52k is formed in the flange 52j. Further, the outer cowl 52 includes a flange 52m in the inside of the side blinker notch 52b formed in the front end portion of the outer cowl 52 and a front-bracket-fixing bolt hole 52n is formed in the flange 52m.

As shown in FIG. 7, a head-pipe-fixing bolt hole 72b and a main-frame-fixing bolt hole 72c are in a shell portion 72a of the inner cowl 72, while a down-tube-fixing bolt hole 71c is also formed in a rear portion of the bulging portion 71a of the radiator cover 71.

The bulging portion 71a is formed upwardly from a front portion to a rear portion of the radiator 23 and is brought into contact with an edge portion of the radiator 23. Thus, the radiator 23 can efficiently introduce air which exists in a wide range in front of the radiator 23 compared to a radiator having no bulging portion 71a.

In the cowl structure of the vehicle 10 explained above, the bulging portion 71a which is formed in a direction to be oblique rearwardly and upwardly in a side view of the vehicle is, in the vicinity of the head pipe 12 and the front fork 13, mounted on the lower end portion of the radiator cover 71 which covers from the side surface to the lower end of the radiator 23 arranged in front of both cylinder heads 17*a*, 17*b* of the engine 17. Accordingly, it is possible to easily apply the down force which pushes the vehicle body in the downward direction to the front wheel 15. Further, the bulging portion 71*a* which applies the down force to the front wheel 15 is mounted on the lower end portion of the radiator cover 71. Thus, a longitudinal length of the vehicle can be shortened and the weight of the vehicle can be reduced. Further, the appearance of the vehicle can be enhanced.

In addition, in the above-mentioned cowl structure of the vehicle 10, the projecting portions 52*d* of the left and right outer cowls 52, 52 bulge to the outside of the vehicle body than the bulging portions 71*a* behind the radiator 23. Thus, it is possible to enhance the aerodynamic characteristic by smoothly making use of the air which is deflected toward the side of the vehicle body by the bulging portions 71*a* and is directed toward the rear portion of the vehicle body in the vicinity of the bulging portions 71*a*.

Further, in the above-mentioned cowl structure of the vehicle 10, the projecting portions 52*d* of the left and right outer cowls 52, 52 are positioned above the bulging portions 71*a*. Thus, portions of the air which are deflected toward the upper portion of the vehicle body by the bulging portions 71*a* are received by the lower surfaces 52*f* of the projecting portions 52*d* so as to change the directions of the flow of the portions of the air downwardly whereby, it is possible to reduce an amount of the air on a rider (a driver) during operation of the vehicle.

In addition, in the above-mentioned cowl structure of the vehicle 10, since the radiator cover 71 forms the opening portion 71*b* which opens toward the rear portion of the vehicle body, due to a negative pressure which is generated by the air which is deflected as the air passes the bulging portions 71*a* of the radiator cover 71 during the operation of the vehicle, the air can easily pass through the radiator 23. Thus, it is possible to enhance a cooling efficiency of the radiator 23.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cowl structure of a vehicle comprising:
   a front cowl for covering a front portion of a vehicle body;
   a radiator being positioned in front of cylinder heads of an engine;
   a radiator cover for covering the radiator from side surfaces to a lower end of the radiator; and
   a bulging portion bulging outwardly in a lateral direction from each of right and left side surfaces of the radiator cover, each of the bulging portions also extending from a front portion to a rear portion of the radiator cover,
   wherein the bulging portions are formed in the rearward and upward oblique direction in a side view of the vehicle and are formed on a lower end portion of the radiator covers,
   wherein the radiator cover includes an opening portion on each of right and left sides surfaces of the radiator cover;
   wherein the opening portions open toward a rear portion of the vehicle body.

2. The cowl structure of a vehicle according to claim 1, wherein the front cowl includes projecting portions which bulge more in the lateral direction towards sides of the vehicle body as compared to the bulging portions behind the radiator.

3. The cowl structure of a vehicle according to claim 2, wherein the projecting portions are positioned above the bulging portions.

4. The cowl structure of a vehicle according to claim 2, wherein the bulging portion of the radiator cover is disposed to be mounted beneath a lower end of said front cowl and is disposed to be mounted relative to vehicle in a forward direction relative to the projecting portions of the front cowl.

5. The cowl structure of a vehicle according to claim 2, wherein the projecting portion receives air during operation of the vehicle which is deflected downwardly for reducing a portion of the air directed towards an operator.

6. The cowl structure of a vehicle according to claim 1, wherein the radiator cover covers a portion of the side surfaces of the radiator and a portion of a front surface of the radiator.

7. The cowl structure of a vehicle according to claim 1, wherein the radiator cover includes left and right inner cowls for securing to left and right outer cowls for enhancing the rigidity of the front cowl.

8. The cowl structure of a vehicle according to claim 1, wherein the bulging portions of the radiator cover receives and deflects air during operation of the vehicle to flow rearwardly and to deflect the air to apply a down force for pushing a vehicle body downwardly.

9. A cowl structure for use with a vehicle comprising:
   a front cowl adapted for covering a front portion of a vehicle body;
   a radiator being positioned in front of cylinder heads of an engine;
   a radiator cover for covering from side surfaces to a lower end of the radiator; and
   a bulging portion bulging outwardly in a lateral direction from each of right and left side surfaces of the radiator cover, each of the bulging portions also extending from a front portion to a rear portion of the right and left sides surfaces of the radiator cover;
   wherein the bulging portions are formed in a rearward and upward oblique direction in a side view of the vehicle on a lower end portion of the radiator covers,
   wherein the radiator cover includes an opening portion on each of right and left sides surfaces of the radiator cover;
   wherein the opening portions open toward a rear portion of the vehicle body.

10. The cowl structure for use with a vehicle according to claim 9, wherein the front cowl includes projecting portions which bulge more in the lateral direction towards sides of the vehicle body as compared to the bulging portions behind the radiator.

11. The cowl structure for use with a vehicle according to claim 10, wherein the projecting portions are positioned above the bulging portions.

12. The cowl structure for use with a vehicle according to claim 10, wherein the bulging portion of the radiator cover is disposed to be mounted beneath a lower end of said front cowl and is disposed to be mounted relative to vehicle in a forward direction relative to the projecting portions of the front cowl.

13. The cowl structure for use with a vehicle according to claim 10, wherein the projecting portion receives air during operation of the vehicle which is deflected downwardly for reducing a portion of the air directed towards an operator.

14. The cowl structure for use with a vehicle according to claim 9, wherein the radiator cover covers a portion of the side surfaces of the radiator and a portion of a front surface of the radiator.

15. The cowl structure for use with a vehicle according to claim 9, wherein the radiator cover includes left and right inner cowls for securing to left and right outer cowls for enhancing the rigidity of the front cowl.

16. The cowl structure for use with a vehicle according to claim 9, wherein the bulging portions of the radiator cover receives and deflects air during operation of the vehicle to flow rearwardly and to deflect the air to apply a down force for pushing a vehicle body downwardly.

* * * * *